United States Patent [19]

Pour-el et al.

[11] 3,713,843

[45] Jan. 30, 1973

[54] WATER SOLUBLE PROTEIN MATERIALS

[75] Inventors: Akiva Pour-el, St. Paul; Thomas C. Swenson, Bloomington, both of Minn.

[73] Assignee: Archer Daniels Midland Company, Minneapolis, Minn.

[22] Filed: Nov. 30, 1971

[21] Appl. No.: 203,443

Related U.S. Application Data

[63] Continuation of Ser. No. 797,669, Feb. 7, 1969, abandoned.

[52] U.S. Cl. ............................99/79, 99/17, 99/28
[51] Int. Cl. ..............................A23l 1/00, A23j 1/14
[58] Field of Search ..........99/28, 79, 17, 14; 195/29; 260/123.5

[56] References Cited

UNITED STATES PATENTS

| | | | |
|---|---|---|---|
| 2,489,173 | 11/1949 | Burnett et al. | 99/14 |
| 3,126,286 | 3/1964 | Moshy | 99/17 |
| 1,218,190 | 3/1917 | Kummerlander | 99/79 |
| 2,259,582 | 10/1941 | Perky et al. | 99/29 |
| 3,219,454 | 11/1965 | Howard et al. | 99/28 |
| 2,473,255 | 6/1949 | Parfentjev | 99/14 |

*Primary Examiner*—Joseph Scovronek
*Assistant Examiner*—Stephen B. Davis
*Attorney*—Plumley, Tyner & Sandt

[57] ABSTRACT

Dispersed insoluble plant proteins are digested with acid active enzymes under quiescent acidic conditions to completely dissolve the insoluble colloidal protein within the reaction medium. Following the digestion, the reaction medium is centrifuged and freeze-dried to form a soluble proteinaceous powder. The soluble protein can be included within carbonated or non-carbonated acidic beverages.

9 Claims, No Drawings 3,713,843

WATER SOLUBLE PROTEIN MATERIALS

This application is a continuation of Ser. No. 797,669, filed Feb. 7, 1969, and now abandoned.

This invention relates to water soluble proteins and particularly to water soluble plant proteins which are adapted for use in beverages. A particularly significant embodiment of the invention relates to an acid pH beverage which contains a modified soybean protein in clear solution.

Many efforts have been made in the recent years to develop high protein food materials which are adapted for specific nutritional aims. Particularly pertinent among these developments are the so-called "health" foods which are adapted to reduce the consumption of carbohydrates while maintaining the nutritional value of the products consumed. One particular problem with these solutions is that proteins which are used to supply the required nutritional values are generally insoluble or only partially soluble in the beverages as marketed. Since the consumer generally requires not only a product which is nutritionally acceptable, but one which is aesthetically acceptable, it has been desirable to produce beverages in the form of clear solutions. Thus, the consumer is attracted by the combined nutritional value of the product and the clean, clear appearance of the product. For reasons other than consumer attraction, it is also desirable to have clear solutions for ease in packaging. Processing equipment can be adapted much more readily to handle solutions than to handle dispersions or emulsions since the latter tend to form sediments which clog flow lines and pumps.

In the past, proteins have not been adapted for use in beverages having acid pH since they do not completely dissolve to form sparkling clear solutions. Simple proteins, e.g. globulins, are insoluble in aqueous solutions and even the relatively soluble secondary and primary digestion products of simple proteins, e.g., proteoses and peptones, do not dissolve enough to give clear solutions. Additionally, proteins vary in their solubility characteristics. Generally, proteins are least soluble at their isoelectric point which is the pH at which proteins are electrically neutral. As the pH is changed from the isoelectric point to more acid or more alkaline values, the protein becomes relatively more soluble. This is true of the generally insoluble plant globulins (simple proteins) and of the relatively soluble peptones and proteoses, etc. (primary and secondard split-products). The increased solubility at acid of alkaline pH generally thought to be caused by the formation of proteinates or protein-salts which are soluble salts of proteins formed by the reaction of the ionizable groups in the protein molecule with ions produced by the base or acid, respectively. However, it will be apparent that since the cationic content of the protein is generally low, it is not possible to obtain substantially complete solubility of the protein by adjusting the pH. It is further apparent that extremely acid or extremely basic solutions are not adapted for consumption. Thus, even though conversion of plant globulins to lower derivatives generally increases the protein solubility and even though decreasing pH further increases solubility, it has not been possible to produce sparkling clear solutions of proteins at pH in the range of 2–3 since the increased solubility is not adequate and since proteins are difficult to dissolve due to physical parameters.

Accordingly, it is the primary object of the present invention to provide a protein which is adapted for forming sparkling clear solutions at acid pH.

Another object is to provide a process for forming the water-soluble proteins from plant globulins, particularly from soybean protein.

Still another object is to provide a process for forming acid soluble protein by reacting an insoluble protein with an acid active enzyme at acid pH.

Still another object is to provide a process which is comprised of treating an insoluble plant protein at a pH which corresponds to the pH of intended solubility.

Yet another object of the invention is to provide a beverage which is adapted to have an acid pH and to contain in a sparkling clear solution up to 20 percent of a modified plant globulin.

Still another object is to provide a process for converting insoluble soybean proteins into a substantially completely acid soluble protein with greater ease of dissolution.

These objects are accomplished in accordance with the present invention by treating a dispersed plant globulin with an acid active enzyme at acid pH with controlled agitation wherein the enzyme digests the plant proteins in colloidal suspension and produces a protein which is approximately 100 percent soluble in the reaction medium and wherein the pH of the reaction medium is approximately the pH of the beverage intended to contain the thus treated protein. The invention thus involves a proteolysis performed at a specific pH range.

It will thus be seen that the present invention provides a method for treating the simple proteins (globulins) with enzymes to digest such simple proteins and form the primary and secondary split-product derivatives thereof. These derivatives are proteins of a less complex nature and their digested products, which upon digestion by elementary enzymes, will yield amino acids adapted for assimilation in the body. The treatment in accordance with the present invention facilitates solutions of proteins in beverages, particularly carbonated beverages. Since the insoluble proteins are split and since the pH is strongly acidic, the solubilizing tendencies of these treatments are combined with the increased solubility rendered by this process. By conducting the proteolysis at acid pH, it is possible to digest only the insoluble or dispersed protein, thus avoiding the necessity of treating the already soluble protein at the given pH.

Before specifically describing the process steps of the invention, the range of materials adapted to be treated and to be formed should be illustrated. The proteins which are intended to be treated are all plant globulins, i.e., simple proteins which yield only alpha-amino acids or their derivatives upon hydrolysis. Said simple proteins are more particularly those vegetable proteins, such as glycinin, which are derived from soybeans. However, the invention is adapted to treat all globulins derived from plants. Plants, of course, include not only vegetables but cereals such as corn, wheat, rye, malt, and fruit kernels, etc. The invention will be described in terms of the treatment of soy proteins. The enzymes which may be used to treat the plant globulins are proteinases, i.e., those which are active in breaking the piptide bond, particularly those which are active at acid pH of 2 to 5 such as fungal proteinases, pepsin, or any other acid active enzyme. It is not intended to limit the invention to a specific enzyme nor to a specific protein since the invention lies in the process which enables one to produce a substantially completely acid soluble protein from an insoluble protein.

Referring more specifically to the process, it should be pointed out that the digestion medium provided is generally an aqueous dispersion of protein containing 3–6 percent protein in colloidal dispersion. Any suitable acid may be added to the aqueous dispersion to provide the acidic pH required for digestion. An example is a combination of 6 normal hydrochloric acid and concentrated phosphoric acid. The addition of the acid active enzyme is performed by stirring approximately 0.1 – 1 percent based on the protein or 0.003 – 0.03 percent based on the total slurry of the enzyme and allowing the reaction medium to settle. During digestion, quiescent conditions are maintained. Since the pH gradually rises during digestion, it is sometimes necessary to add acid to maintain a low pH. This pH adjustment is performed by periodically adding concentrated phosphoric acid or other acids to adjust the pH; adjusting to pH 2.7 is generally adequate. After sufficient time has elapsed for the colloidal protein to be digested and for the larger solids to settle out of solution, the digested protein slurry is cooled and centrifuged and the solid residue is discarded. The soluble material is dried and renders a powdery product which is adapted for forming sparkling clear solutions at pH of approximately 2.7 to 4.75, indicating substantially complete solubility. Other methods of recovering the soluble matter are clearly adapted for use herein. To further illustrate the invention, the following specific embodiment is presented by way of non-limiting example.

EXAMPLE

Approximately 100 g of Nutrisoy 7-B (a commercially available soy protein flour) is extracted by mixing with about 20 times its weight in water at 96°–100° F for one hour with constant agitation. The resulting slurry is allowed to settle and is decanted. The solid residue is extracted by mixing with approximately 10 times its weight of water for one hour at 96°–100° F with no agitation. The resulting slurry is centrifuged and filtered and the solid residue discarded. The supernatent liquid from the first extraction and the second extraction are combined and hydrochloric acid is added to bring the pH of the liquid to 4.75. This liquid is centrifuged (filtering may be substituted here) and the super-natent liquid is discarded. The solid residue is washed twice with 10 times its weight in water and the washings are discarded. The washed solid residue is used to make a 3 percent solids aqueous slurry to which is added a mixture of 6 normal hydrochloric acid and concentrated phosphoric acid to bring the pH to 3.5.

To the acid slurry is added 0.03% by weight based on the weight of the slurry of acid fungal proteinase with stirring. After settling the medium is left for a period of 2 days wherein the pH is periodically adjusted to about 2.7–4 by addition of concentrated phosphoric acid. The digestion medium is maintained in a generally quiescent state during the digestion period except during the acid additions and the originally present colloidal dispersion gradually is converted into a sparkling clear phase. After the 2 days, the digested protein slurry is cooled to about 15° C, centrifuged, and the solid residue is discarded while the supernatent liquid is converted by means of freeze drying into a powdered product. Upon adding the powdered product to water and adjusting the pH to from 2.7 to 4.75, the proteinaceous material is substantially completely dissolved and forms a sparkling clear liquid when quantities up to 20% by weight of the soluble proteinaceous material are used.

The above-noted example clearly illustrates that the protein which is initially insoluble can be converted to a substantially completely soluble material by treatment according to the present invention. During the process, it is desirable to avoid allowing the pH to rise above a point at which solubility occurs, this generally corresponding to the maximum pH at which the digested protein may be used, i.e., 4.75. During digestion, the pH naturally rises due to formation of the protein-salts and concurrent consumption of acid, and additions of phosphoric acid are intended to maintain the reaction pH at below 4.75. If the reaction is allowed to proceed to a point wherein the pH reaches 4.75, the resulting product has a bad taste and is incompletely soluble. One explanation is that the colloidal solubility of soy protein is lowest a pH of approximately 4.75. and since it is desired to keep the colloidal sized protein dispersed for maximum digestion, it is desirable to avoid a pH of low solubility. It may further be desirable to maintain the pH of the reaction medium at approximately the pH which will be present in the beverage. For example, if a beverage is intended to be produced having a pH of 2.7 it is sufficient to maintain the pH of the reaction or digestion medium at approximately 2.7.

Another aspect of the process relates to the quiescent condition of the digestion medium during the digestion period. Initially, agitation is provided to mix the enzyme throughly throughout the dispersion; however, the dispersion should be allowed to settle and should be maintained in a relatively quiescent state during the entire digestion period, except that some disruption occurs when acid is added. The material which is larger than colloidal size will thus be allowed to settle to the bottom and will be separated from the colloidal proteinaceous material which is intended to be treated by the process. A suitable time for digestion is 6 hours to 1 week preferably on the order of 1–2 days, for example, 15 to 20 hours. The time of digestion depends on the activity of the enzyme used and the temperature of digestion; generally long time periods over 4 days, for example, produce a bitter product with specific enzymes and are to be avoided, if possible. The concentration of enzyme based on the weight of the total mixture can range from 0.003 up to 0.03 percent by weight. Similarly, the concentration of the protein slurry treated may contain protein in quantities of from 3 to 6 percent by weight. The maximum efficiency is attained when the digestion medium is maintained at approximately 40° C. However, other temperatures may be utilized with a somewhat reduced efficiency when the enzyme used dictates other temperatures. Cooling after digestion is performed so as to precipitate insoluble material and avoid such precipitation from beverages formed from the protein when the beverages are refrigerated by the consumer. Cooling to temperatures from about −5° to 20° C is sufficient.

When a carbonated beverage is formed using the permanently soluble protein (P.S.P.) of this invention, a suitable formulation is prepared as follows:

Flavored carbonated protein drinks were prepared using permanently soluble protein, (P.S.P.) produced by a variety of proteolylic enzymes. The following formulation was used:

1.4 g cool ade (any flavor)
62.5 g sugar
500.0 g carbonated $H_2O$
15.0 g P.S.P.

The P.S.P. can be added either before or after addition of the carbonated water. The mixture should be stirred gently, to prevent excessive foaming, until all the P.S.P. is dissolved. The pH of the final solution will be between 2.5–3.0.

While carbonated beverages are referred to above as being the most common "acid" beverages it should be understood that the invention extends to non-carbonated "acid" beverages. One such beverage is an orange drink prepared as follows:

100 g reconstituted orange juice
3 g P.S.P. (permanently soluble protein).

The ingredients are combined in either order. The mixture is stirred gently until all P.S.P. is dissolved. The final pH is between 3.0 and 4.0.

Having described the invention in full, clear, and concise terms and having presented by way of non-limiting example secured by Letters Patent is:

Which is claimed is:

1. The process for solubilizing insoluble plant proteins to make a clear solution which comprises forming a dispersion of said protein in an acid medium, adding an acid active enzyme, and allowing quiescent digestion to proceed until the insoluble colloidal protein is substantially completely dissolved in the reaction medium.

2. The process of claim 1 wherein the plant protein is derived from soybean and is present in a quantity of from about 3 to 6 percent by weight.

3. The process of claim 1 wherein the reaction pH is maintained at 2.7 – 4.75.

4. The process of claim 1 wherein the enzyme used is active in acid pH of from 2 to 5.

5. The process of claim 1 wherein the time of reaction is from 15 to 20 hours.

6. The process of claim 1 wherein the digestion product is subjected to clarification by centrifuging and freeze drying.

7. The product produced by the process of claim 1.

8. A clear aqueous solution which has a pH in the range of 2.7 to 4.75 and which contains up to 20 percent of a substantially completely dissolved modified plant protein produced by the process of claim 1 and which had been clarified by centrifuging to remove solid residue and then dried.

9. The product of claim 8 wherein the solution is carbonated.

* * * * *